(12) United States Patent
Wright et al.

(10) Patent No.: US 11,338,749 B2
(45) Date of Patent: May 24, 2022

(54) BUMPER ASSEMBLY FOR AN AUTOMOTIVE VEHICLE

(71) Applicant: GM GLOBAL TECHNOLOGY OPERATIONS LLC, Detroit, MI (US)

(72) Inventors: Jacob Wright, Grosse Pointe Woods, MI (US); Changyoung Heo, Lake Orion, MI (US); Vinayshankar L. Virupaksha, Troy, MI (US); Trevor T. Winch, Howell, MI (US); Donald M. Jamison, Warren, MI (US); Srinivasa Rao Vaddiraju, Troy, MI (US); Amlanjyoti Barman, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 149 days.

(21) Appl. No.: 17/010,900

(22) Filed: Sep. 3, 2020

(65) Prior Publication Data
US 2022/0063529 A1  Mar. 3, 2022

(51) Int. Cl.
*B60R 19/02* (2006.01)
*B60R 19/18* (2006.01)

(52) U.S. Cl.
CPC ............ *B60R 19/023* (2013.01); *B60R 19/18* (2013.01); *B60R 2019/186* (2013.01); *B60R 2019/1806* (2013.01)

(58) Field of Classification Search
CPC . B60R 19/023; B60R 19/18; B60R 2019/186; B60R 2019/1806
See application file for complete search history.

(56) References Cited

U.S. PATENT DOCUMENTS

| | | | | |
|---|---|---|---|---|
| 5,860,685 A | * | 1/1999 | Horney | B60R 19/48 180/68.1 |
| 6,000,738 A | * | 12/1999 | Stewart | B60R 19/18 293/120 |
| 6,945,576 B1 | * | 9/2005 | Arentzen | B60K 13/02 296/208 |
| 2021/0380056 A1 | * | 12/2021 | Gunaydin | B60R 19/34 |

* cited by examiner

*Primary Examiner* — D Glenn Dayoan
*Assistant Examiner* — Melissa Ann Bonifazi

(57) ABSTRACT

An automotive vehicle includes a body having fore and aft portions. The vehicle includes a bumper beam coupled to the vehicle body proximate the fore portion and a heat exchanger disposed aft of the bumper beam. A fascia assembly is coupled to the vehicle body and extends about the bumper beam. The fascia assembly includes a fascia inlet configured to direct an airflow from the exterior of the fascia assembly to the interior of the fascia assembly. An energy absorption member is disposed between the fascia and the bumper beam. An air passage extends through at least one of the bumper beam and the energy absorption member. The air passage extends from an air passage inlet to an air passage outlet. The air passage inlet is positioned downstream of the fascia inlet with respect to the airflow, and the air passage outlet being positioned upstream of the heat exchanger.

16 Claims, 5 Drawing Sheets

BUMPER ASSEMBLY FOR AN AUTOMOTIVE VEHICLE

TECHNICAL FIELD

The present disclosure relates to automotive vehicles, and more particularly to bumper structures of automotive vehicles. A vehicle typically includes a body structure having a bumper beam attached thereto. The bumper beam is provided to receive and dissipate forces applied to the exterior of the vehicle, e.g. as may occur during a collision. Such bumper beams accommodate a variety of design considerations, including collision requirements, airflow requirements, and stylistic requirements.

SUMMARY

An automotive vehicle according to the present disclosure includes a vehicle body having a fore portion and an aft portion. The vehicle includes a bumper beam coupled to the vehicle body proximate the fore portion and a heat exchanger disposed aft of the bumper beam. The vehicle also includes a fascia assembly coupled to the vehicle body and extending about the bumper beam. The fascia assembly includes a fascia inlet configured to direct an airflow from the exterior of the fascia assembly to the interior of the fascia assembly. The vehicle further includes an energy absorption member disposed between the fascia and the bumper beam. An air passage extends through at least one of the bumper beam and the energy absorption member. The air passage extends from an air passage inlet to an air passage outlet. The air passage inlet is positioned downstream of the fascia inlet with respect to the airflow, and the air passage outlet being positioned upstream of the heat exchanger.

In an exemplary embodiment, the energy absorption member includes a first surface, a second surface, and a body extending from the first surface to the second surface. The air passage inlet is disposed at the first surface, and the air passage outlet being disposed at the second surface. In such an embodiment, the first surface may be a lower surface, and the second surface may be an upper surface.

In an exemplary embodiment, the bumper beam includes a first surface, a second surface, and a body extending from the first surface to the second surface. The air passage inlet is disposed at the first surface, and the air passage outlet is disposed at the second surface. In such an embodiment, the first surface may be a fore surface, and the second surface may be an upper surface. The bumper beam may extend laterally from a first side of the vehicle to a second side of the vehicle, with the bumper beam including a plurality of lateral rib members. At a first lateral portion of the bumper beam a web extends between the plurality of lateral rib members, and at a second portion of the bumper beam no web extends between the plurality of rib members, such that the air passage inlet and the air passage outlet being defined at the second portion.

In an exemplary embodiment, the energy absorption member includes a first surface, the bumper beam includes a second surface, the air passage inlet is disposed at the first surface, and the air passage outlet is disposed at the second surface.

In an exemplary embodiment, the air passage is sized to receive 30% of airflow through the fascia inlet.

A bumper assembly according to the present disclosure includes a bumper beam and a fascia assembly extending about the bumper beam. The fascia assembly includes a fascia inlet configured to direct an airflow from the exterior of the fascia assembly to the interior of the fascia assembly. The bumper assembly also includes an energy absorption member disposed between the fascia and the bumper beam. An air passage extends through at least one of the bumper beam and the energy absorption member. The air passage extends from an air passage inlet to an air passage outlet, with the air passage inlet being positioned downstream of the fascia inlet with respect to the airflow and being sized to receive between 20% and 40% of the airflow.

In an exemplary embodiment, the energy absorption member includes a first surface, a second surface, and a body extending from the first surface to the second surface, with the air passage inlet being disposed at the first surface and the air passage outlet being disposed at the second surface. The first surface may be a lower surface, and the second surface may be an upper surface.

In an exemplary embodiment, the bumper beam includes a first surface, a second surface, and a body extending from the first surface to the second surface, with the air passage inlet being disposed at the first surface and the air passage outlet being disposed at the second surface. The first surface may be a fore surface, and the second surface may be an upper surface. The bumper beam may extend laterally from a first side of the vehicle to a second side of the vehicle, with the bumper beam including a plurality of lateral rib members. At a first lateral portion of the bumper beam a web extends between the plurality of lateral rib members, and at a second portion of the bumper beam no web extends between the plurality of rib members, such that the air passage inlet and the air passage outlet being defined at the second portion.

In an exemplary embodiment, the energy absorption member includes a first surface, the bumper beam includes a second surface, the air passage inlet is disposed at the first surface, and the air passage outlet is disposed at the second surface.

In an exemplary embodiment, the air passage is sized to receive 30% of airflow through the fascia inlet.

Embodiments according to the present disclosure provide a number of advantages. For example, a bumper assembly according to the present disclosure may provide adequate airflow to a heat exchanger while also providing stylistic freedom and satisfying bumper performance requirements, e.g. high speed and low speed requirements.

The above advantage and other advantages and features of the present disclosure will be apparent from the following detailed description of the preferred embodiments when taken in connection with the accompanying drawings.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but are merely representative. The various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desirable for particular applications or implementations.

Figure 1:
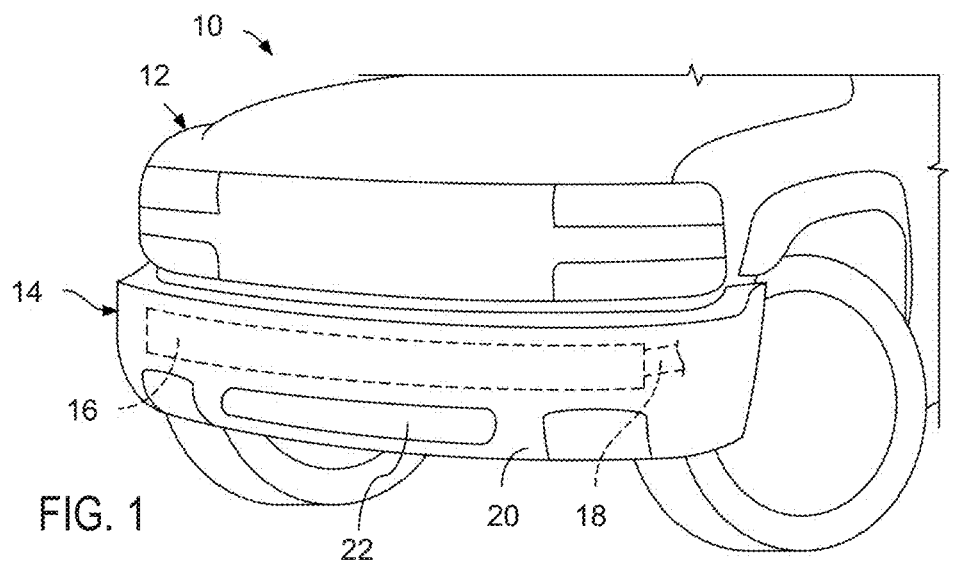
FIG. 1 is an illustrative view of an automotive vehicle according to an embodiment of the present disclosure.

Referring now to FIG. 1, an automotive vehicle 10 according to an embodiment of the present disclosure is illustrated. The vehicle 10 has a body 12. At least one bumper assembly 14 is coupled to the body 12. A front bumper 14 is shown at a fore portion of the body 12 in FIG. 1. In the illustrated embodiment the bumper assembly 14 has a long axis extending in a widthwise direction of the vehicle, i.e. generally orthogonal to a longitudinal axis of the body 12. The bumper assembly 14 includes a bumper beam 16. The bumper beam 16 is coupled to other structural members of the body 12 via one or more longitudinal rails 18. A fascia assembly 20 is disposed about the bumper beam 16. The fascia assembly 20 may form the exterior of the bumper assembly 14. The fascia assembly 20 includes an air inlet 22. When the automotive vehicle 10 is in forward motion, a portion of ambient air in the vicinity of the vehicle 10 may be drawn through the air inlet 22 into the interior of the fascia assembly 22.

The bumper beam 16 and accompanying energy absorption (EA) material, discussed in further detail below, may be sized to satisfy various regulatory requirements. Generally speaking, however, these components will be of a size to block airflow. Vehicles according to known designs therefore have fascia inlets disposed on a same side of the bumper beam (e.g. an upper side) as any components which require airflow. This may impose an undesirable constraint on vehicle styling.

Figure 2:
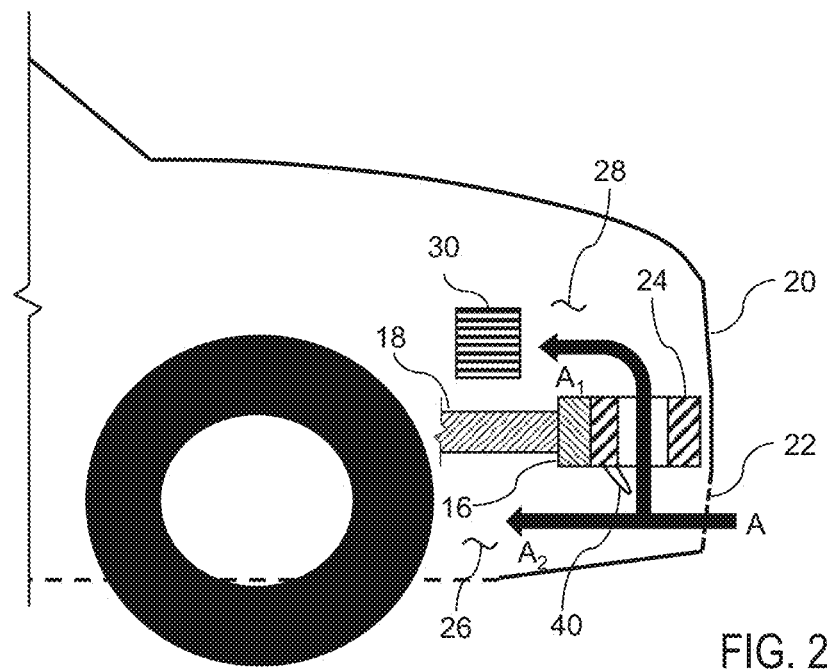
FIG. 2 is a schematic illustration of a bumper assembly according to an embodiment of the present disclosure.

Referring now to FIG. 2, a cross-section of a first embodiment of a bumper assembly 14 is illustrated schematically. An EA member 24 comprising EA material is disposed between the bumper beam 16 and the fascia 20. The bumper beam 16 and EA member 24 divide the space within the fascia 20 into a lower portion 26 and an upper portion 28. The inlet 22 draws ambient air into the lower portion 26. A heat exchanger 30, e.g. for a cabin HVAC system, is disposed in the upper portion 28.

Figure 3:
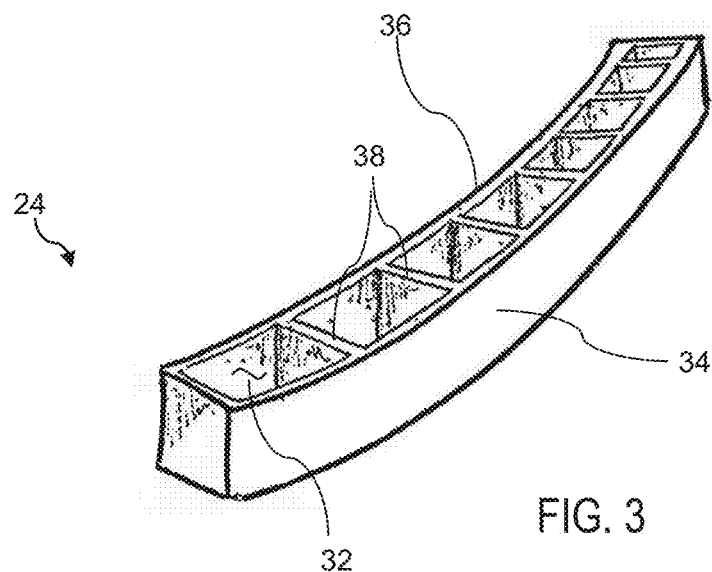
FIG. 3 is an isometric view of an energy absorbing member according to an embodiment of the present disclosure.
Figure 4:
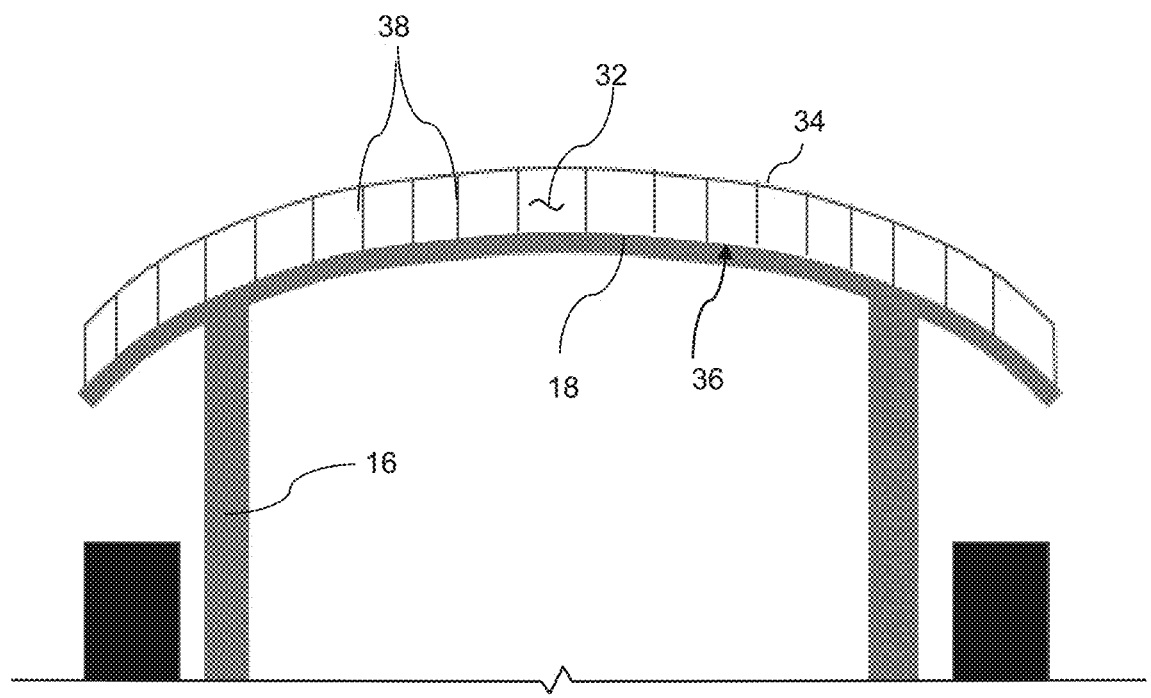
FIG. 4 is a top view of an energy absorbing member according to an embodiment of the present disclosure.

Conventionally, the EA material would comprise a solid foam which would inhibit air from the inlet 22 from reaching the heat exchanger 30. However, as shown in FIGS. 2-4, the EA member 24 comprises at least one passage 32 extending between the lower surface of the EA member 24 and the upper surface of the EA member 24. The passage(s) 32 enable fluid communication between the lower portion 26 and the upper portion 28. The EA member 24 may be formed of any suitable material, e.g. plastic sheets which may be sonically welded to one another.

As may be seen most clearly in FIGS. 3 and 4, the EA member 24 is a generally elongate body having a fore surface 34, an aft surface 36, and a plurality of web members 38 extending between the fore surface 34 and aft surface 36. The plurality of web members 38 define the passage(s) 32 therebetween. In the embodiment shown in FIGS. 3 and 4, the passages 32 extend substantially the full width of the EA member 24. However, in other embodiments the passages 32 may be provided in only a portion of the width of the EA member 24, e.g. to provide selective airflow to a targeted region. Likewise, other configurations of EA members are contemplated within the scope of the present disclosure, e.g. a lattice structure.

As shown in FIG. 2, an airflow A may be drawn into the inlet 22 into the lower portion 26 when the vehicle 10 is in forward motion. A portion $A_1$ of the airflow A may be directed into the passage(s) 32, e.g. via a deflection member 40 disposed at the lower surface of the EA member 24, and subsequently into the upper portion 28. The remainder $A_2$ of the airflow A may remain in the lower portion 26. In an exemplary embodiment, the portion $A_1$ of the airflow A which is directed via the passage(s) 32 is between 20% and 40% of the airflow A, e.g. 30% of the airflow A.

As may be seen, the inlet 22 located below the bumper beam 16 may nevertheless provide airflow to a heat exchanger 30 positioned above the bumper beam 16. As will be appreciated by one of ordinary skill in the art, a similar configuration may be implemented to direct air from the upper portion 28 to the lower portion 26, e.g. if the inlet 22 was disposed above the bumper beam 16 and EA member 24.

Figure 5:
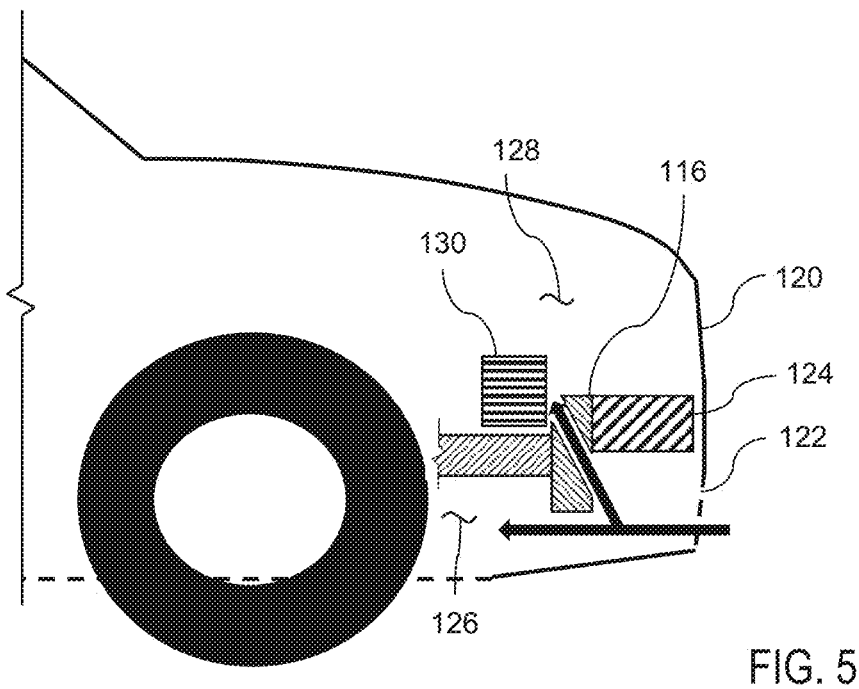
FIG. 5 is a schematic illustration of a bumper assembly according to an embodiment of the present disclosure.

Referring now to FIG. 5, an alternative embodiment is illustrated schematically. An EA member 124 comprising EA material is disposed between a bumper beam 116 and a fascia 120. The bumper beam 116 and EA member 124 divide the space within the fascia 120 into a lower portion 126 and an upper portion 128. The inlet 122 draws ambient air into the lower portion 126. A heat exchanger 130 is disposed in the upper portion 128.

Figure 6:
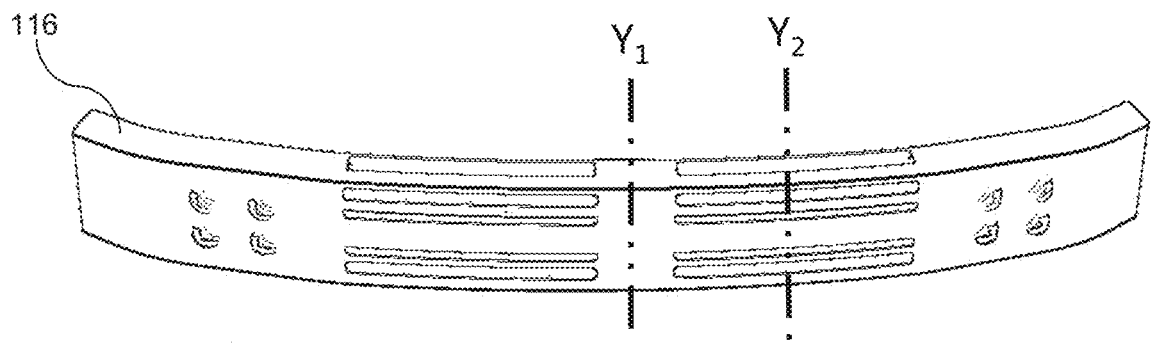
FIG. 6 is an isometric view of a bumper beam according to an embodiment of the present disclosure.
Figure 7A:
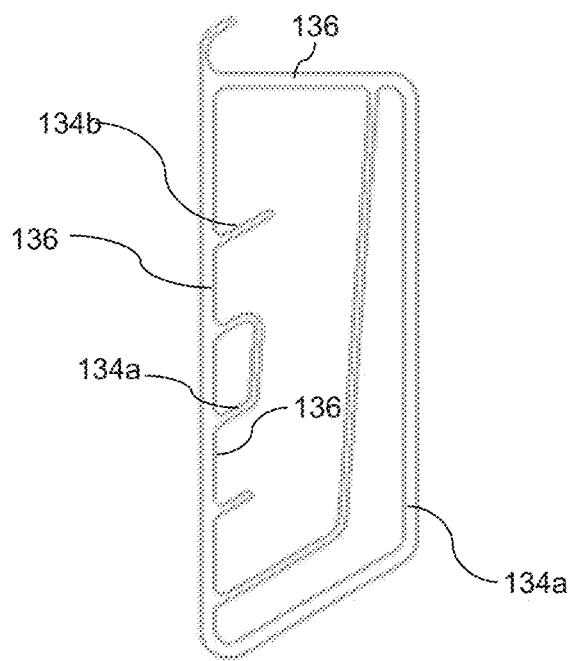
FIGS. 7a and 7b are cross-sectional views of the bumper beam illustrated in FIG. 6.
Figure 7B:
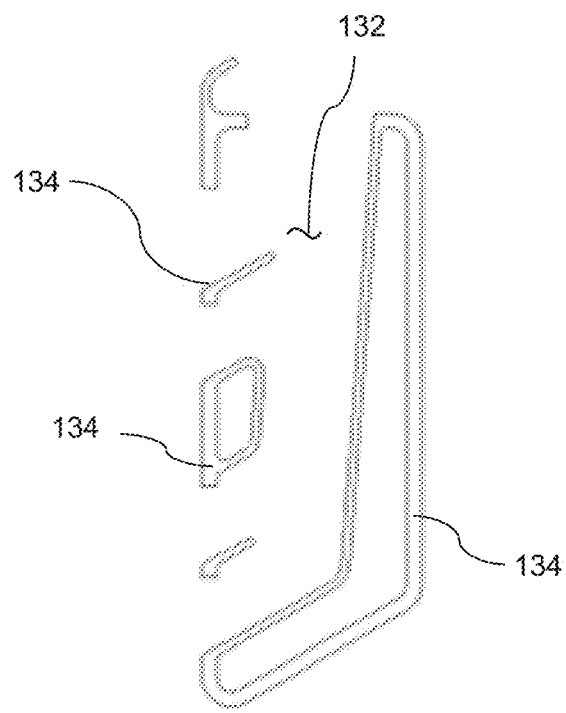

In this embodiment, rather than providing the EA member 124 with passages, one or more passages 132 are provided in the bumper beam 116. As shown in FIGS. 6, 7a, and 7b, the bumper beam 116 comprises a plurality of fin members 134 extending laterally, i.e. from a driver side of the vehicle to a passenger side. The plurality of fin members 134 may include a combination of closed profile fin members 134a and open profile fin members 134b, the configuration of which may be determined according to desired functionality as will be discussed in further detail below.

At a first lateral position $Y_1$, shown in FIG. 6, one or more webs 136 extend among the fin members 134, as shown in cross-section in FIG. 7a. At a second lateral position $Y_2$, at least one of the webs 136 is not present, as shown in FIG. 7b, thereby defining a passage 132 through the bumper beam 116.

In an exemplary embodiment, the bumper beam 116 is formed of metal, and the plurality of fin members 134 and webs 136 are formed via machining or other suitable process.

As shown in FIG. 5, an airflow may be drawn into the inlet 122 into the lower portion 126 when the vehicle is in forward motion. A portion of the airflow may be directed into the passage(s) 132 and subsequently into the upper portion 128 and thereby provide airflow to the heat exchanger 130. The remainder of the airflow may remain in the lower portion 126.

Referring now to FIGS. 8-13, various cross-sectional profiles of bumper beams according to embodiments of the present disclosure are shown. The configuration and placement of fin members may be selected such that closed profile fin members provide stiffness, while the combination of open profile fin members and closed profile fin members guide airflow as desired.

Figure 8:
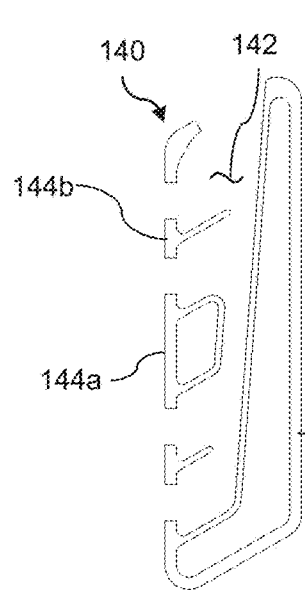
FIGS. 8-13 are cross-sectional views of bumper beams according to various embodiments of the present disclosure.

In the embodiment illustrated in FIG. 8, the bumper beam 140 includes open profile fin members 144b arranged to guide airflow through the top face of the bumper beam 140, while the closed profile fin members 144a provide structural continuity in addition to guiding airflow.

Figure 9:
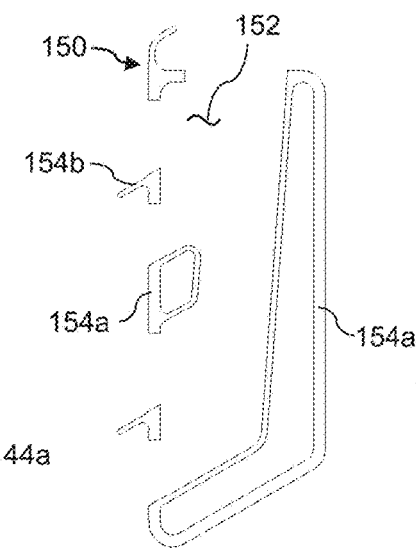

In the embodiment illustrated in FIG. 9, the bumper beam 150 includes open profile fin members 154b which extend toward the exterior of the bumper beam 150 configured to guide airflow through the top of the bumper beam 150.

Figure 10:
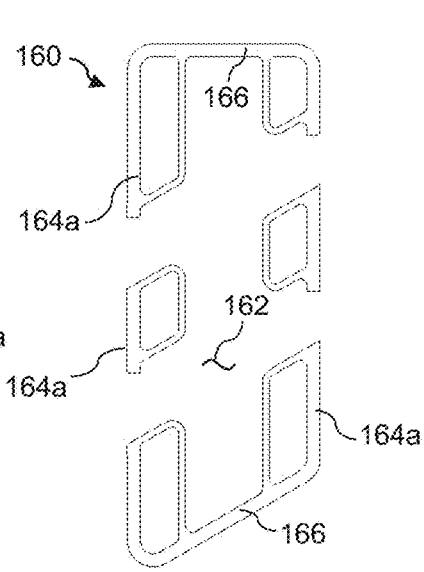

In the embodiment illustrated in FIG. 10, the bumper beam 160 includes a plurality of closed profile fin members 164a. The closed profile fin members 164a have generally parallelogram profiles, such that faces of the closed profile fin members 164a define passages 162 to guide airflow through the rear face of the bumper beam 160. In this embodiment, webs 166 remain at upper and lower faces of the bumper beam 160 to prevent air from flowing through the upper and lower faces.

Figure 11:
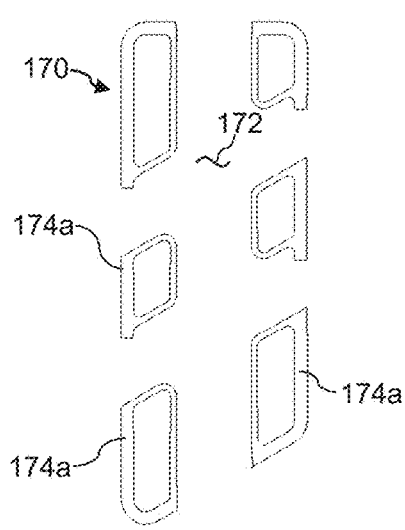

In the embodiment illustrated in FIG. 11, the bumper beam 170 includes a plurality of closed profile fin members 174a. In this embodiment, the closed profile fin members 174a define passages 172 to guide airflow through top, bottom, and rear faces of the bumper beam 170.

Figure 12:
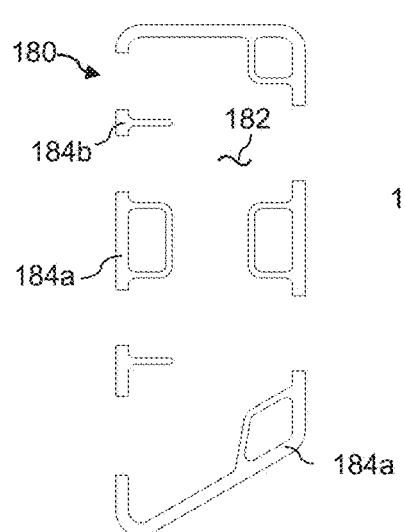

In the embodiment illustrated in FIG. 12, the bumper beam 180 includes closed profile fin members 184a and open profile fin members 184b which guide airflow from the front face of the bumper beam 180 through the rear face of the bumper beam 180.

Figure 13:
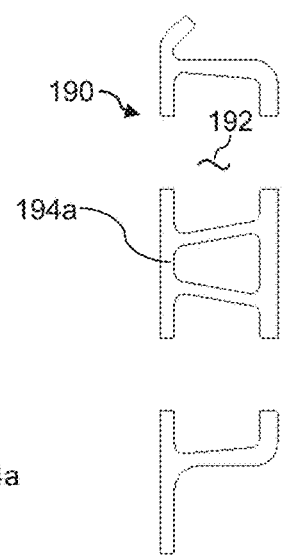

In the embodiment illustrated in FIG. 13, the bumper beam 190 includes closed profile fin members 194a which guide airflow from the front face of the bumper beam 190 through the rear face of the bumper beam 190.

As may be seen, combinations of fin members having different profiles may be utilized in a bumper beam to satisfy structural requirements while also enabling desired airflow.

Figure 14:
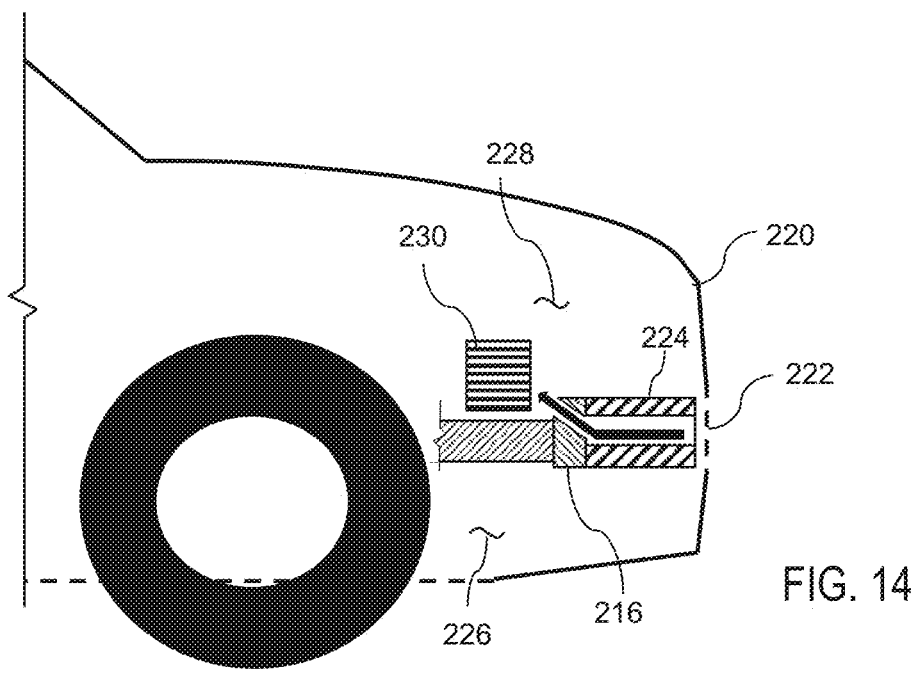
FIG. 14 is a schematic illustration of a bumper assembly according to an embodiment of the present disclosure.

Referring now to FIG. 14, another alternative embodiment is illustrated schematically. An EA member 224 comprising EA material is disposed between a bumper beam 216 and a fascia 220. The bumper beam 216 and EA member 224 divide the space within the fascia 220 into a lower portion 226 and an upper portion 228. The inlet 222 draws ambient air into the lower portion 226. A heat exchanger 230 is disposed in the upper portion 128.

In this embodiment, one or more passages extend through both the EA member 224 and the bumper beam 216. The EA member 224 may be configured generally similarly to the EA member 24 illustrated in FIG. 1, having longitudinal passages rather than vertical. The bumper beam 216 may be configured with passages as discussed above, e.g. generally similar to the embodiments depicted in FIG. 12 or 13.

As shown in FIG. 14, an airflow may be drawn into the inlet 222 into the lower portion 226 when the vehicle is in forward motion. A portion of the airflow may be directed into the passage(s) through the EA member 224 and bumper beam 216 and subsequently into the upper portion 228 and thereby provide airflow to the heat exchanger 230. The remainder of the airflow may remain in the lower portion 226.

As may be seen, a bumper assembly according to the present disclosure may provide adequate airflow to a heat exchanger in a compact space while also providing stylistic freedom and satisfying bumper performance requirements.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further exemplary aspects of the present disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. An automotive vehicle comprising:
a vehicle body having a fore portion and an aft portion;
a bumper beam coupled to the vehicle body proximate the fore portion;
a heat exchanger disposed aft of the bumper beam;
a fascia assembly coupled to the vehicle body and extending about the bumper beam, the fascia assembly including a fascia inlet configured to direct an airflow from the exterior of the fascia assembly to the interior of the fascia assembly;
an energy absorption member disposed between the fascia and the bumper beam; and
an air passage extending through at least one of the bumper beam and the energy absorption member, the air passage extending from an air passage inlet to an air passage outlet, the air passage inlet being positioned downstream of the fascia inlet with respect to the airflow, the air passage outlet being positioned upstream of the heat exchanger.

2. The automotive vehicle of claim 1, wherein the energy absorption member includes a first surface, a second surface, and a body extending from the first surface to the second surface, the air passage inlet being disposed at the first surface, the air passage outlet being disposed at the second surface.

3. The automotive vehicle of claim 2, wherein the first surface is a lower surface, and wherein the second surface is an upper surface.

4. The automotive vehicle of claim 1, wherein the bumper beam includes a first surface, a second surface, and a body extending from the first surface to the second surface, the air passage inlet being disposed at the first surface, the air passage outlet being disposed at the second surface.

5. The automotive vehicle of claim 4, wherein the first surface is a fore surface, and wherein the second surface is an upper surface.

6. The automotive vehicle of claim 4, wherein the bumper beam extends laterally from a first side of the vehicle to a second side of the vehicle, the bumper beam comprising a plurality of lateral rib members, wherein at a first lateral portion of the bumper beam a web extends between the plurality of lateral rib members, and wherein at a second portion of the bumper beam no web extends between the plurality of rib members, the air passage inlet and the air passage outlet being defined at the second portion.

7. The automotive vehicle of claim 1, wherein the energy absorption member includes a first surface, the bumper beam includes a second surface, the air passage inlet is disposed at the first surface, and the air passage outlet is disposed at the second surface.

8. The automotive vehicle of claim 1, wherein the air passage is sized to receive 30% of airflow through the fascia inlet.

9. A bumper assembly comprising:
a bumper beam;
a fascia assembly extending about the bumper beam, the fascia assembly including a fascia inlet configured to direct an airflow from the exterior of the fascia assembly to the interior of the fascia assembly;
an energy absorption member disposed between the fascia and the bumper beam; and
an air passage extending through at least one of the bumper beam and the energy absorption member, the air passage extending from an air passage inlet to an air passage outlet, the air passage inlet being positioned downstream of the fascia inlet with respect to the airflow and being sized to receive between 20% and 40% of the airflow.

10. The bumper assembly of claim 9, wherein the energy absorption member includes a first surface, a second surface, and a body extending from the first surface to the second surface, the air passage inlet being disposed at the first surface, the air passage outlet being disposed at the second surface.

11. The bumper assembly of claim 10, wherein the first surface is a lower surface, and wherein the second surface is an upper surface.

12. The bumper assembly of claim 9, wherein the bumper beam includes a first surface, a second surface, and a body extending from the first surface to the second surface, the air passage inlet being disposed at the first surface, the air passage outlet being disposed at the second surface.

13. The bumper assembly of claim 12, wherein the first surface is a fore surface, and wherein the second surface is an upper surface.

14. The bumper assembly of claim 12, wherein the bumper beam extends laterally from a first side of a vehicle to a second side of a vehicle, the bumper beam comprising a plurality of lateral rib members, wherein at a first lateral portion of the bumper beam a web extends between the plurality of lateral rib members, and wherein at a second portion of the bumper beam no web extends between the plurality of rib members, the air passage inlet and the air passage outlet being defined at the second portion.

15. The bumper assembly of claim 9, wherein the energy absorption member includes a first surface, the bumper beam includes a second surface, the air passage inlet is disposed at the first surface, and the air passage outlet is disposed at the second surface.

16. The bumper assembly of claim 9, wherein the air passage is sized to receive 30% of airflow through the fascia inlet.

* * * * *